United States Patent [19]
van der Wal

[11] Patent Number: 5,274,004
[45] Date of Patent: Dec. 28, 1993

[54] PROCESS FOR CONVERSION OF POLYURETHANE POLYMER TO POLYOL AND FRESH POLYURETHANE POLYMER THEREFROM

[75] Inventor: Hanno R. van der Wal, Kreeksingel, Netherlands

[73] Assignee: The Dow Chemical Company, Midland, Mich.

[21] Appl. No.: 898,870

[22] Filed: Jun. 15, 1992

[51] Int. Cl.$^5$ ............................................. C08J 11/24
[52] U.S. Cl. ............................. 521/49.5; 252/182.22; 252/182.26; 521/174; 528/78
[58] Field of Search ............... 252/182.22, 182.26; 521/49.5, 174; 528/78

[56] References Cited

U.S. PATENT DOCUMENTS

| | | | |
|---|---|---|---|
| 2,937,151 | 5/1960 | Ten Brocck et al. | 521/49 |
| 3,117,940 | 1/1964 | McElroy | 521/49.5 |
| 3,300,417 | 1/1967 | McElroy | 521/49.5 |
| 3,404,103 | 10/1968 | Matsuoaira et al. | 521/49.5 |
| 3,441,616 | 4/1969 | Pizzini et al. | 568/621 |
| 3,632,530 | 1/1972 | Kinoshita | 564/393 |
| 3,708,440 | 1/1973 | Frulla et al. | 521/49.5 |
| 3,738,946 | 6/1973 | Frulls et al. | 521/49.5 |
| 4,110,266 | 8/1978 | Sheratte | 521/49 |

*Primary Examiner*—Maurice J. Welsh
*Assistant Examiner*—Rachel Johnson

[57] ABSTRACT

A process for the recovery of scrap polyurethane polymer in the form of a polyol, and the use of said polyol to prepare a fresh polyurethane polymer. Said process involves thermally treating scrap polyurethane at an elevated temperature with a liquid mixture which consists of an alkanolamine and a metal hydroxide and subsequently reacting the resulting intermediate product with an alkylene oxide comprising propylene oxide to obtain polyol. The recovery process is characterized in that the weight ratio of scrap polyurethane to liquid mixture is from at least 12:1, and the liquid mixture contains the alkanolamine in from about 70 to about 95 weight percent. The recovered polyol can be used to prepare fresh polyurethane foam that exhibits enhanced physical properties at a reduced isocyanate consumption compared to similar foam prepared in the absence of any recovered polyol.

19 Claims, No Drawings

5,274,004

PROCESS FOR CONVERSION OF POLYURETHANE POLYMER TO POLYOL AND FRESH POLYURETHANE POLYMER THEREFROM

This invention relates to a process for the conversion of polyether polyol-based scrap polyurethane polymer to useful polyols and the manufacture of fresh polyurethane polymer therefrom.

BACKGROUND OF THE INVENTION

Polyurethane polymers are generally produced by the reaction of a polyisocyanate, particularly diisocyanates, with hydroxyl-rich compounds containing at least two hydroxyl groups per molecule, such as glycols, polyester and polyether polyols or amine-rich compounds such as aromatic and aliphatic diamines and polyamines. The extensive industrial use of polyurethane polymer and the production thereof is accompanied by a considerable accumulation of waste or scrap polyurethane polymer. Such scrap polymer may be disposed of by techniques including incineration or landfill. However such disposal techniques, besides not giving full consideration to the environment, essentially lead to the permanent loss of costly materials as used in the preparation of polyurethane polymer. It is therefore of interest to consider the recovery and eventual reuse of such materials.

Procedures of recovering the chemicals in scrap polyurethane polymer are known in the art. U.S. Pat. No. 2,937,151 discloses dissolving flexible polyurethane foams in liquid polyalkylene glycol ethers, polyester or polyesteramides. U.S. Pat. No. 3,632,530 discloses decomposition of a polyurethane by heating in the presence of an aliphatic diol such as ethylene glycol or dipropylene glycol. However, in practice, methods for recovering scrap polyurethane based on degradation of the foams in the presence only of alcohol groups are excessively time consuming, even in the presence of catalysts, such as taught in U.S. Pat. No. 3,300,417. An increased rate of dissolution of the scrap urethane foam by the use of primary amines in place of alcohols is taught in U.S. Pat. No. 3,117,940. U.S. Pat. No. 3,708,440 discloses the dissolution of isocyanurate foam in a mixture of diethylene glycol and diethanolamine. U.S. Pat. No. 3,404,103 discloses decomposing polyurethane in an aliphatic amine, e.g. monoethanolamine, and the presence of an alkali metal oxide or alkali metal hydroxide, such as sodium hydroxide, to obtain an amine derivative and a polyether; separating the polyether from the amine derivative and reemploying the polyether for production of urethane polymer.

All of the procedures noted above yield a mixture of polyols, aromatic and aliphatic ureas, and aromatic and aliphatic amines, and occasionally some soluble urethane fragments. Further such mixtures, as obtained according to the above noted procedures, frequently undergo a phase separation into a low density and viscosity polyol component and a higher viscosity and density amine component. Such two phase mixtures besides being more difficult to handle must always be well mixed before they can be used in any subsequent application or else there is little or no control of reproducibility and consistency of results. The susceptibility of the recovered material to phase separation becomes greater as the amount of scrap polymer to be treated per unit volume solvent increases. Additionally, the presence of frequently odorous amine is generally undesirable when using recovered material to prepare a fresh polyurethane polymer as it may enhance the reactivity of the system to such an extent that only poor quality polymer articles may result. Accordingly it is generally required that such amine content be removed from the mixture. Suitable techniques for the removal of the amine component include, for example, distillation procedures such as disclosed in U.S. Pat. Nos. 3,404,103; 4,316,992; 4,317,939 and 4,399,236. However, separation of polyol and amine components is undesirable due to additional energy and labor costs.

As an alternative to removing the amine component from the recovered mixture, the complete mixture may be further treated with an alkylene oxide. Such treatment as disclosed in, for example, U.S. Pat. Nos. 3,738,946 and 4,110,266 converts the amine functionality to less reactive hydroxyl functionality thus facilitating the reuse of such material in the preparation of fresh polyurethane polymer.

Despite the seemingly extensive disclosure of recovery/recycling technology for waste or scrap polyurethane polymer there still remains a need to provide a process which provides a more useful recovered material and is economically advantageous to operate. Particularly it is desirable to provide a process which allows, in a relatively shorter period of time, the recycling of large volumes of scrap material without encountering phase separation. It is further desirable that such process provide for a product that may be appropriately treated to give an end product which is substantially free of any hydrogen-bearing nitrogen atoms.

SUMMARY OF THE INVENTION

It is now found that the above mentioned deficiencies can be substantially overcome according to the invention as defined hereinafter.

In a first aspect, this invention relates to a process for the recovery of scrap polyether polyol-based polyurethane polymer in the form of a polyol by thermally treating said scrap polyurethane at an elevated temperature with a liquid mixture which consists of an alkanolamine and a metal hydroxide and subsequently reacting the resulting intermediate product with an alkylene oxide to provide said polyol characterized in that the weight ratio of scrap polyurethane to liquid mixture is from at least 12:1; the liquid mixture contains the alkanolamine in from about 70 to about 95 weight percent; and the alkylene oxide comprises propylene oxide.

In a second aspect, this invention relates to an intermediate product suitable for the preparation of a polyether polyol obtainable by thermally treating polyether polyol based scrap polyurethane at an elevated temperature with a liquid mixture which consists of an alkanolamine and a metal hydroxide wherein the weight ratio of scrap polyurethane to liquid mixture is from at least 12:1 and in that the liquid mixture contains the alkanolamine in from about 70 to about 95 weight percent characterized in that the intermediate is a stable emulsion.

In a third aspect, this invention relates to a polyol obtained according to the process of the first aspect.

In a fourth aspect, this invention relates to a polyether polyol obtainable by thermally treating a polyurethane, produced by reacting a polyether polyol with a molecular weight of from about 1000 to about 10000 with an aromatic polyisocyanate comprising methylene diphenylisocyanate, at an elevated temperature with a liquid mixture which consists of an alkanolamine and a metal hydroxide and subsequently reacting the resulting intermediate product with an alkylene oxide to provide said polyol characterized in that
  (a) the weight ratio of scrap polyurethane to liquid mixture is from at least 12:1;
  (b) the liquid mixture contains from about 70 to about 95 weight percent of alkanolamine; and
  (c) the alkylene oxide comprising propylene oxide is present in an amount to provide the resulting polyol with a hydroxyl number of from about 30 to about 200.

In a fifth aspect, this invention relates to a process for preparing a polyurethane polymer by reacting an organic polyisocyanate with a polyol wherein the polyisocyanate is present in an amount to provide from at least 0.5 isocyanate groups per isocyanate reactive hydrogen atom of the polyol according to the third or fourth aspect of this invention.

In a sixth aspect, this invention relates to a polyurethane polymer obtained according to the process of the fifth aspect.

In a seventh aspect, this invention relates to a polyol composition suitable for the manufacture of a polyurethane polymer which comprises from about 1 to about 99 weight percent of a polyol according to the third or fourth aspect of this invention.

In an eighth aspect, this invention relates to liquid polyisocyanate composition which comprises the reaction product of an aromatic polyisocyanate with a polyol according to the third or fourth aspect of this invention.

This invention provides a means of efficiently recovering reusable material from polyurethane polymer formerly disposed of as scrap or waste polyurethane polymer in the from of a polyol and subsequently using this to prepare fresh polyurethane polymer. Applicant has found that through the use of the selected liquid mixture consisting of alkanolamine and metal hydroxide that a surprisingly high recycle ratio of waste polyurethane polymer to liquid mixture may be obtained. Even more surprising is that, Applicants recovery process provides a stable intermediate which is a homogeneous mixture or emulsion not particularly susceptible to phase separation. An emulsion provides the advantage of consistency of end product and better control of any activity in which the intermediate product may subsequently be used. Additionally, Applicants have found that during the alkoxylation of the emulsion with alkylene oxide, that to overcome any possibility of phase separation at this stage it is necessary that the alkylene oxide comprises propylene oxide. Further, Applicant has found that when such polyol is used to manufacture fresh polyurethane polymer equivalent or better physical properties, notably compression load deflection, of the resulting polymer are observed at lower isocyanate reaction indices. The ability to operate at a lower reaction index means that less "virgin" material is required to prepare the polymer with favorable economic and environment consequences.

DETAILED DESCRIPTION OF THE INVENTION

The scrap or waste polyurethane polymer to be subjected to the recovery process are generally produced by reaction of polyisocyanates, particularly diisocyanates with polyether polyols. General procedures for reacting a polyisocyanate with an isocyanate-reactive substance are well known in the art and further detailed description thereof is believed unnecessary for the purpose of defining this invention. A wide variety of organic diisocyanates can be used, among which are included aromatic diisocyanates, such as m-phenylene diisocyanate, p-phenylene diisocyanate, 4-t-butyl-m-phenylene diisocyanate, 4-methoxy-m-phenylene diisocyanate, 4-phenoxy-m-phenylene diisocyanate, 4-chloro-m-phenylene diisocyanate, toluene diisocyanates (either as a mixture of isomers, e.g., the commercially available mixture of 80% 2,4-toluene diisocyanate and 20% 2,6-toluene diisocyanate, or as the individual isomers themselves), and polyphenyl polymethylene polyisocyanate. The process of this invention if found to be particularly suitable for treating scrap or waste polyurethane polymer obtained from the reaction of an aromatic polyisocyanate including toluene diisocyanate and especially such aromatic polyisocyanate containing methylene diphenylisocyanate or isocyanate-terminated adducts thereof.

Illustrative of polyether polyols from which the scrap or waste polyurethane are obtainable include polyalkylene ether polyols containing two or more reactive hydroxyl groups, such as diol, triols and tetrols. Such polyether polyols are obtainable by reacting initiators such as glycerol, trimethylolpropane, pentaerythritol, sucrose, sorbitol, dipentaerythritol, or amines such as ethanolamine, ethylene diamine, diethylene triamine, with lower alkylene oxides including ethylene oxide, propylene oxide. To enhance the efficiency of the recovery process and obtain an intermediate product which is not prone to solidification it is preferred, for this invention, to subject scrap polyurethane polymer to the recovery process where such polymer has been obtained by reaction of a polyoxyalkylene or polyether polyol which has a molecular weight of from about 1000 to about 10000, preferably from about 2000 to about 8000 and more preferably from about 3000 to about 7000.

This invention is found to be particularly suited to the treatment of polyether polyol-based polyurethane scrap especially such scrap as may be generated by flexible foam production or RIM and elastomeric polyurethane polymers. Whilst polyester polyol-based polyurethane scrap also may be treated in a like manner it is observed that the product is not stable as evidenced by increasing viscosity with time. Like treatment of scrap polyurethane polymer from rigid foam production frequently results in a glass-like solid which can not be conveniently further processed.

According to this invention, polyurethane scrap is treated at an elevated temperature, typically from about 70° C. to about 200° C., preferably from about 80° C. to about 140° C., with a liquid mixture which consists of an alkanolamine and a metal hydroxide to provide an intermediate product. The weight ratio of scrap polyurethane polymer to liquid mixture is from at least 12:1, and preferably from about 15:1 to about 50:1, and more preferably from about 15:1 to about 30:1. Applicants have found that use of such a high weight ratio results in a stable emulsion which is not susceptible to phase separation. Use of a smaller ratio is observed by Applicants to result in a phase separation.

The liquid mixture contains the alkanolamine in an amount of from about 70 to about 95, preferably from about 85 to about 95 percent by weight. The balance, from about 5 to about 25, preferably from about 5 to about 15 weight percent being made up by the presence of the metal hydroxide. Examples of alkanolamines which can be employed include ethanolamine, N-methylethanolamine, diethanolamine, triethanolamine, propanolamine, dipropanolamine. Especially preferred is diethanolamine which is conveniently handled and provides for significantly shorter process times over other alkanolamines. Pure diethanolamine is a solid at room temperature and therefore it is convenient to use commercial grades of diethanolamine which are aqueous solutions containing water in up to 20 weight percent. The presence of water during the treatment of the scrap polyurethane polymer is observed to favorably reduce the time required to obtain the intermediate product. Advantageously, an amount of water up to about 20, preferably up to about 10 weight percent based on total weight of liquid mixture may be present. Examples of metal hydroxide include the Periodic Group I and II metal hydroxides and mixtures thereof and especially the preferred Group I metal hydroxides such as lithium hydroxide, sodium hydroxide and potassium hydroxide. While hydroxides are specified it is also contemplated that other substances of like basicity including the oxides, alkoxides, phenoxides and thiophenoxides of the same metals will operate equally well in the process of this invention.

The liquid mixture is prepared by combining the alkanolamine and metal hydroxide. Advantageously, to assist in the preparation of the liquid mixture the metal hydroxide may be added to the alkanolamine as an aqueous solution. The water present may be removed by a suitable procedure however it is found advantageous to have the water remain for reasons already mentioned. Once prepared the liquid mixture is brought to the desired temperature, the scrap polyurethane polymer preferably in a comminuted form is then added to the liquid mixture. The polyurethane polymer added to the mixture may be added in one or more increments. The resulting blend is then stirred until an emulsion is obtained. The time required for this varies to an extent on the nature of the polyurethane and the quantity and size of the pieces of polymer being added, but typically times of from about 10 minutes to about 8 hours are generally sufficient to obtain such an emulsion. The emulsion may be stored or directly reacted with an alkylene oxide to provide a polyol suitable for use in the manufacture of fresh polyurethane foam.

The emulsion contains polyols, ureas, both aliphatic and aromatic, aliphatic and aromatic amines, which can include primary and/or secondary amines and may also contain some soluble urethane fragments or suspended solid polyurethane fragments. The amines present in the emulsion can be essentially primary amines but frequently can be a mixture of both primary and secondary amines, depending on the polyurethane polymer subjected to the recovery process. Examples of such amines include methylene diphenylamine, diaminotoluene, ethanolamine and aniline. The emulsion can contain, in total, from about 2 to about 90, more typically from about 2 to about 30 weight percent amines containing isocyanate reactive hydrogen atoms. Such amines will be notably methylene diphenylamine and toluene diamine present as a consequence of the scrap polyurethane polymer being prepared respectively from methylene diphenylisocyanate and toluene diisocyanate. As already mentioned, the presence of such amines containing primary and/or secondary amine groups, when preparing fresh polyurethane polymer, is frequently undesirable because of the higher reactivity of such amine groups toward isocyanates as compared to hydroxyl groups with isocyanate.

The undesirable amine groups present in the intermediate product can be removed by treating the intermediate product with an alkylene oxide. Suitable alkylene oxide or mixtures thereof include the $\alpha,\beta$-oxiranes such as, for example, ethylene oxide, propylene oxide, butylene oxide, pentylene oxide, hexylene oxide, styrene oxide, epichlorohydrin, trichlorobutylene oxide, glycidol and 2,2'-bis(4-(1,2-epoxypropylphenoxy)-propane. The amount of alkylene oxide employed is preferably in excess of the amount required to convert all of the amine present in the intermediate product to polyol. That is, an excess of alkylene oxide is employed with respect to active hydrogen atom of the amine present. Thus, more than one mole of alkylene oxide, such as propylene oxide, is employed per mole of active hydrogen atom of the amines. In preferred practice, more than 2 and up to about 20 moles of alkylene oxide is employed per mole of active hydrogen atom of the amines present.

Applicants have found that to eliminate or minimize the possibility of any phase separation occurring during the alkoxylation procedure that it is necessary for the alkylene oxide to comprise propylene oxide, advantageously the alkylene oxide comprises propylene oxide in from at least 25, preferably from about 40 and more preferably from about 60 weight percent and up to 100 percent of the total alkylene oxide being reacted with the intermediate product. When not composed in its entirety by propylene oxide, the alkylene oxide additionally can comprise one or more other alkylene oxides especially including ethylene oxide, butylene oxide, glycidol and 2,2'-bis(4-(1,2-epoxypropylphenoxy)-propane. When the final polyol is obtained by the reaction of mixtures of propylene oxide including other oxides, such mixture may be introduced directly into the reaction or sequentially as individual components. In the latter case it is preferred that the first oxide introduced is at least a part or all of propylene oxide intended to be present in the end product. The amount of propylene oxide first introduced should be sufficient to prevent the occurrence of phase separation when a second oxide, notably for example ethylene oxide, is introduced. This first amount of propylene oxide needs to be determined experimentally as it is dependent on the nature of the scrap polyurethane polymer subject to the recovery process. From Applicants own observation it is frequently observed that a suitable first amount of propylene oxide required for this purpose typically is from at least 25, and preferably from at least 50 parts per 100 parts by weight of intermediate product.

The reaction of the intermediate product and alkylene oxide is carried out under autogenous pressure which can range from about 25 to about 200 psi, usually between about 25 and about 100 psi. Temperature of the alkoxylation reaction can range from about 80° C. to about 150° C., preferably between about 100° C. and about 130° C.; and the time of reaction can range from as little as 20 minutes to about 24 hours, usually from about 1 to about 6 hours depending on total amount of alkylene oxide to be reacted. Addition of an alkoxylation catalyst is optional but frequently not necessary due to the already present metal hydroxide which can function in this capacity.

During the alkoxylation reaction, the hydrogen-bearing nitrogen centers in the mixture are converted into polyols thereby giving an end product which is substantially free of any hydrogen-containing nitrogen atoms. The end product, polyol, can be characterized in that it has an average hydroxyl number of from about 30 to about 200, preferably from about 50 to about 150. In a preferred embodiment, as will be apparent from the discussion relating to selection of suitable scrap polyurethane polymer, polyol of such hydroxyl number may contain up to about 20 weight percent of an alkoxylated methylene diphenylamine adduct derived from the methylene diphenylisocyanate content of the scrap polyurethane.

The recovered scrap polyether polyol-based polyurethane polymer in the form of a polyol is suitable for preparing fresh polyurethane polymer by reacting it with a polyisocyanate. Polyol having a hydroxyl number as already described is particularly suitable for the preparation of fresh polyurethane polymer which is an elastomer or flexible foam. The so obtained polyol is also suitable for the preparation of isocyanate-terminated prepolymers for subsequent use to give similar fresh polyurethane polymer.

The recovered polyurethane polymer in the form of a polyol can be employed as the entire polyol reactant for reaction with polyisocyanate to produce fresh polyurethane polymer, or such product can be present as a component in a polyol composition to be reacted with the polyisocyanate. When present as a component of a polyol composition, such composition comprises from about 1 to about 99, preferably from about 5 to about 50, more preferably from about 10 to about 45 weight percent of its total weight of recovered scrap polyether polyol-based polyurethane polymer in the form of a polyol. The recovered polyurethane polymer in the form of a polyol or composition containing such is caused to react with suitable polyisocyanates including 2,4- and 2,6-toluene diisocyanates, 2,4'- or 4,4'-methylene diphenylisocyanate, or polyphenyl polymethylene polyisocyanate. Generally the amount of polyisocyanate present will be such to provide an average of from at least 0.5, preferably from about 0.5 to about 1.1, and more preferably from about 0.6 to about 0.95 isocyanate group per isocyanate reactive hydrogen atom of said polyol or polyol composition. Other conventional polyurethane processing components which optionally, but advantageously, are present include urethane promoting catalysts, surfactants and depending on the type of polymer to be produced foaming agents including especially water.

Polyurethane polymers, especially foam, prepared from the recovered scrap polyether polyol-based polyurethane polymer in the form of a polyol are suitable for many applications including upholstery, and sound insulation.

The following examples are presented to illustrate the invention. The scope of the invention is not to be considered limited to such examples. Unless otherwise mentioned all quantities identified are parts by weight.

The scrap polyurethane foams subjected to the recover process are identified as follows:

SCRAP FOAM A

A Cold molded MDI-based flexible polyurethane foam obtainable according to the given formulation:

| 10 parts by weight VORANOL CP 6001 a 6000 molecular | |
|---|---|
| | weight polyoxypropylene-oxyethylene triol available from The Dow Chemical Company; |
| 3.75 | Water; |
| 0.8 | DABCO 33LV, a proprietary amine catalyst available from Air Products; |
| 0.15 | NIAX A1, a proprietary amine catalyst available from Union Carbide; |
| 0.8 | a silicon-based surfactant, TEGOSTAB B4113 available from Th.Goldschmidt AG; |
| Index 100 | SPECFLEX NF253, a proprietary MDI-based isocyanate composition with NCO content of 29 percent, available from The Dow Chemical Company. |

SCRAP FOAM B

A flexible polyurethane slabstock foam obtainable according to the given formulation:

| 100 parts by weight VORANOL CP 3322 a 3000 molecular | |
|---|---|
| | weight polyoxypropylene-oxyethylene triol available from The Dow Chemical Company; |
| 2.8 | Water; |
| 0.8 | dimethylethanolamine (DMEA); |
| 0.1 | NIAX A1, a proprietary amine catalyst available from Air Products; |
| 0.7 | a silicon-based surfactant, TEGOSTAB B2370 available from Th.Goldschmidt AG; |
| 0.22 | tin octoate; |
| Index 105 | Toluene diisocyanate, 80 percent 2,4-isomer, 20 percent 2,6-isomer. |

EXAMPLE 1

Intermediate products 1 to 4 and Comparative Intermediates A to D are obtained according to the hereinafter general procedure. Specific materials, quantities and conditions are given in Table I.

The liquid mixture is prepared from the mentioned materials and brought to the indicated elevated temperature. Comminuted scrap polyurethane foam is added to the liquid mixture, over a period of from about 15 to about 720 minutes, in an amount to provide a final weight ratio of foam to liquid mixture as given. The so obtained mixture is maintained, with stirring, at the elevated temperature, for a further 30 to 240 minutes to ensure complete treatment of the scrap foam. Properties of the resulting intermediate product are also indicated in Table I. Where reported, the methylene diamine(MDA) or toluene diamine(TDA) content is observed with reverse phase high pressure liquid chromatography using a U.V. detector at 254 nm. The mobile phase is a 50:50 methanol:water mixture operated with a C18 stationary phase.

TABLE I

Preparation and Properties of Intermediate Product.

| Intermediate | 1 | 2 | 3 | A* | B* | C* | D* |
|---|---|---|---|---|---|---|---|
| Liquid Mixture: (pbw) | | | | | | | |
| Diethanolamine(1) | 25 | 25 | 203 | 100 | 50 | / | 25 |
| Diethylene glycol | / | / | / | / | / | 25 | / |
| Potassium Hydroxide(2) | 5 | 5 | 40 | 20 | 10 | 5 | 5 |
| Temperature (C.) | 150 | 170 | 150 | 150 | 150 | 180 | 170 |
| Scrap Foam - Type | A | B | A | A | A | A | B |
| (pbw) | 350 | 400 | 6095 | 100 | 300 | 350 | 250 |
| Addition time (mins.) | 300 | / | 720 | 30 | 120 | / | / |
| Weight Ratio Foam:Liquid Mixture | 14:1 | 16:1 | 30:1 | 1:1 | 6:1 | 16:1 | 10:1 |
| Post treatment time (minutes) | 60 | 90 | / | 90 | 90 | 90 | 90 |
| Intermediate Product | | | | | | | |
| MDA % | n.o. | / | 3.2 | n.o. | n.o. | 3.6 | / |
| TDA % | / | 5.47 | / | / | / | / | n.o. |
| Viscosity(3) at 25° C. | 36000 | n.o. | 43000 | 13000 | 18000 | n.o. | n.o. |
| Stability: Separation (after 24 hr at 60° C.) | no | no | no | yes | yes | no | yes |

*Not an example of this invention
(1)Commercial grade containing 10 weight percent water
(2)Added as an aqueous solution, 50 weight percent
(3)Viscosity measured with cone/plate Contraves Rheomat 135 at 1 rpm with cone CP9.
n.o. not observed

EXAMPLE 2: ALKOXYLATION OF INTERMEDIATE PRODUCT

Intermediate products of Example 1 are reacted with alkylene oxide, in the absence of alkoxylation catalyst, to provide a polyol. The alkoxylation reaction is conducted at a temperature of from about 100° C. to about 120° C. in a closed reaction vessel. The alkylene oxide is added at such a rate to maintain a pressure of from about 2 to about 5 atmospheres (29 to 73 psi) until the desired amount is fed. The reacting mixture is then maintained at the same temperature until all oxide is reacted. This can be seen by monitoring the change of pressure with time. When the pressure is seen to remain constant then reaction of intermediate product with alkylene oxide is considered to be completed. The so obtained crude polyol containing a metal hydroxide content is treated with a 10 percent mole excess, based on hydroxide content, of dodecylbenzene sulphonic acid (DBSA) to provide a finished polyol. Table II indicates which intermediates products are reacted with which oxides to provide Polyols 4 to 7 and Comparative Polyol E to H.

From Polyols 6 and 7 it is observed that attempting to prepare final polyol having a hydroxyl number of greater than 200 leads to a product which is of high viscosity, susceptible to solid sedimentation. Considering Comparative Examples E to H shows the necessity of having an alkylene oxide other than just ethylene oxide to provide a stable end product.

Hydroxyl Number of the resulting polyol is determined in accordance with test procedure ASTM D-4274(c); viscosity is determined using a Brookfield Spindle 4 at 12 rpm.

TABLE II

| Polyol | 4 | 5 | 6 | 7 | E* | F* | G* | H* |
|---|---|---|---|---|---|---|---|---|
| Intermediate Product Example/pbw | 3/1965 | 3/1965 | 3/1965 | 3/1965 | 3/1883 | 3/1883 | 3/1883 | 3/1883 |
| Propylene Oxide (pbw) | 1694 | 676 | 399 | 100 | / | / | / | / |
| Ethylene Oxide (pbw) | / | / | / | / | 102 | 337 | 638 | 1553 |
| wt % PO of end polyol | 46.3 | 25.6 | 14.7 | 4.8 | / | / | / | / |
| wt % EO of end polyol | / | / | / | / | 5.1 | 15.2 | 25.3 | 45.2 |
| wt % unreacted MDA present in end polyol | 0.06 | 0.3 | 0.8 | 1.4 | 1.66 | 0.43 | 0.10 | 0.02 |
| hydroxyl Number | 157 | 183 | 232 | 266 | n.o. | n.o. | n.o. | n.o. |
| Viscosity at 25° C. | 4950 | 8000 | 32500 | 57000 | n.o. | n.o. | n.o. | n.o. |
| Appearance | uniform liquid phase | uniform liquid phase | liquid phase + solids sedimentation | liquid phase + solids sedimentation | two distinct liquid phases | two distinct liquid phases | two distinct liquid phases | two distinct liquid phases |

EXAMPLE 3

Polyols 8 and 9 are prepared from Intermediate Product 3.

| Step | | Polyol 8 | Polyol 9 |
|---|---|---|---|
| | Intermediate Product | 4412 | 2047 |
| | 50% aqueous KOH | 63.1 | 12.2 |
| 1 | Remove water to less than 0.1% | | |
| 2a | Propylene oxide feed at 115° C. | 9481 | 1433 |
| 2b | Ethylene oxide feed at 120° C. | / | 614 |
| 3 | 50% aqueous KOH | 41.2 | 23.1 |
| 4 | Remove water to less than 0.1% | | |
| 4a | Propylene oxide feed at 115° C. | / | 2870 |
| 4b | Ethylene oxide feed at 120° C. | 1894 | 1812 |
| 5 | Acid neutralized | | |
| | Polyol viscosity | 4760 | 2200 |
| | Hydroxyl number | 89 | 79 |
| | Total PO content of polyol | 60 | 49 |
| | Total EO content of polyol | 12 | 28 |
| | Total "scrap polyurethane" content of polyol | 26 | 23 |

The general procedure is as employed for the preparation of Polyols 4 to 7. However, in this case the alkoxylation reaction is catalyzed by the addition of potassium hydroxide. The amounts of material used, parts by weight, and the sequential procedure employed is given above.

EXAMPLE 4

Expanded polyurethane polymer, Foams 1 to 8 and Comparative Foams J to L, is prepared from the so obtained polyol. The formulations are given below along with some of the physical properties of the resulting foam. The isocyanate used to prepare the polyurethane foam in these examples is SPECFLEX NF253 as defined earlier. Where reported, foam properties are measured according to the following test procedures: Compressive Load Deflection (CLD), hysteresis, SAG factor(CLD65%/CLD25%) - DIN 53577; elongation - DIN 53571; resilience - ASTM D-5374, test H(1986).

Review of the compressive load deflection (CLD) performance indicates that foam may be prepared according to this invention at a lower isocyanate than for conventional foam when using polyols obtained from polyurethane polymer. When such polyol is present in about 40 weight percent of the polyol formulation used to prepare the foam; the CLD performance of foam prepared at an isocyanate reaction index of about 70 is similar to that of a foam prepared in the absence of such polyol and at an isocyanate reaction index of 90. The surprising equivalence of CLD performance at lower isocyanate index provides for a reduced consumption of costly polyisocyanate. This reduced consumption can be of the order of from 10 to 20 weight percent.

The SAG factor is the ratio of CLD at 65%:CLD at 25 percent. A higher SAG factor is indicative of a greater degree of support and sitting comfort of polyurethane foam as might be used for cushioning and upholstery applications. Foams prepared according to this invention display an unexpectedly high SAG factor.

The enhanced performance of polyurethane foams obtained according to this invention while not fully understood is thought to be as a consequence of selecting an alkanolamine in the process of recovering scrap polyurethane polymer as a polyol. Foam prepared from recovered polyurethane scrap in the form of a polyol obtained by treatment with diethylene glycol, in contrast to alkanolamine, does not provide for the same advantageous enhancement in physical properties of the resulting foam.

| parts by weight | Foam 1 | Foam 2 | Foam 3 | Foam 4 | Foam 5 | Foam 6 | Foam 7 | Foam 8 | Foam J* | Foam K* | Foam L* |
|---|---|---|---|---|---|---|---|---|---|---|---|
| VORANOL CP6001 | 60 | 60 | 60 | 60 | 80 | 80 | 80 | 80 | 100 | 100 | 100 |
| Polyol No.-/pbw | 8./40 | 8./40 | 8./40 | 8./40 | 8./20 | 8./20 | 8./20 | 8./20 | / | / | / |
| Water | 3.75 | 3.75 | 3.75 | 3.75 | 3.75 | 3.75 | 3.75 | 3.75 | 3.75 | 3.75 | 3.75 |
| DABCO 33LV | 0.8 | 0.8 | 0.8 | 0.8 | 0.8 | 0.8 | 0.8 | 0.8 | 0.8 | 0.8 | 0.8 |
| NIAX A1 | 0.15 | 0.15 | 0.15 | 0.15 | 0.15 | 0.15 | 0.15 | 0.15 | 0.15 | 0.15 | 0.15 |
| TEGOSTAB B4113 | 0.8 | 0.8 | 0.8 | 0.8 | 0.8 | 0.8 | 0.8 | 0.8 | 0.8 | 0.8 | 0.8 |
| Isocyanate Index | 60 | 70 | 80 | 90 | 70 | 80 | 90 | 100 | 90 | 100 | 110 |
| Density kg/m3 | 45 | 43 | 45 | 44 | 49 | 42 | 44 | 44 | 40 | 46 | 44 |
| CLD at 40% (KPa) | 2.0 | 2.6 | 3.7 | 6.2 | 1.3 | 2.8 | 5.3 | 6.2 | 2.9 | 5.7 | 5.9 |
| SAG factor | 4.7 | 4.1 | 4.7 | 5.2 | 4.0 | 3.9 | 4.3 | 3.8 | 3.5 | 3.5 | 3.6 |
| Elongation (%) | 129 | 127 | 109 | 95 | 142 | 125 | 120 | 113 | 129 | 122 | 123 |
| Hysteresis (%) | 29 | 30 | 34 | 40 | 16 | 22 | 28 | 31 | 18 | 24 | 24 |
| Resilience (%) | 37 | 39 | 41 | 37 | 50 | 52 | 49 | 47 | 60 | 58 | 54 |

EXAMPLE 5

In this example, polyol obtained according to the invention is used to prepare fresh polyurethane foam suitable for use in a sound insulation application (Foam 9) and elastomer application (Foam 10).

| parts by weight | Foam 9 | Foam 10 |
|---|---|---|
| VORANOL CP6001 | 50 | / |
| Ethylene glycol | / | 22.5 |
| Polyol No.- pbw | 9./50 | 7./120 |
| Water | 3.75 | 0.6 |
| DABCO 33LV | 0.8 | 0.8 |
| NIAX A1 | 0.15 | / |
| TEGOSTAB B4113 | 0.8 | 0.8 |
| Isocyanate Type | SPECFLEX NF253 | VORANATE M220 |
| Isocyanate Index | 100 | 108 |
| Density kg/m3 | 36.0 | 636 |
| CLD at 40% (KPa) | 7.3 | / |
| SAG factor | 4.8 | / |
| Elongation (%) | / | / |
| Hysteresis (%) | 49 | / |
| Resilience (%) | 24 | / |

Foam 9 shows that polyol obtained according to this invention is particularly of value to prepare foams with high hysteresis and low resilience which is required for sound and mechanical dampening applications.

Example 10 demonstrates the use of large quantities of recycle polyol in a low density RIM application.

EXAMPLE 6

In this example, polyol obtained according to the invention is used to prepare a urethane-modified isocyanate composition. The composition is obtained by reacting 51 parts by weight of Polyol 8 with 100 parts by weight of a methylene diphenylisocyanate mixture containing the 4,4'-isomer and the 2,4'-isomer in a 50:50 weight ratio. The resulting isocyanate composition is observed to have an isocyanate content of 19.2 percent and a viscosity of 1250 cps at 25° C.

The so obtained isocyanate composition is observed to exhibit good storage stability with no solidification or crystal deposition occurring after 4 weeks at room temperature. Observation of such storage stability is in itself surprising as Polyol 8 was treated with an acid, dodecylbenzene sulphonic acid to provide the finished polyol. Normally to obtain urethane-modified isocyanate compositions which exhibit good storage stability it is necessary to use polyol which does not have a salt content such as resulting from in situ treatment of the basic alkoxylation catalyst with an acid. The presence of salts such as, for example, potassium acetate promotes instability of modified isocyanate compositions.

What is claimed is:

1. A process for the recovery of scrap polyether polyol-based polyurethane polymer in the form of a polyol by thermally treating said scrap polyurethane at an elevated temperature with a liquid mixture which consists of an alkanolamine and a metal hydroxide and subsequently reacting the resulting intermediate product with an alkylene oxide to provide said polyol; characterized in that the weight ratio of scrap polyurethane to liquid mixture is from at least 12:1; the liquid mixture contains the alkanolamine in from about 70 to about 95 weight percent; and the alkylene oxide comprises propylene oxide.

2. The process of claim 1 wherein the elevated temperature is from about 70° C. to about 200° C.

3. The process of claim 2 wherein the alkanolamine is diethanolamine.

4. The process of claim 2 wherein the metal of the metal hydroxide is potassium or sodium.

5. The process of claim 1 wherein the amount of alkylene oxide reacted with the intermediate product is such to provide the polyol with a hydroxyl number of from about 30 to about 200.

6. The process of claim 5 wherein the alkylene oxide further comprises ethylene oxide, butylene oxide or 2,2'-bis(4-(1,2-epoxypropylphenoxy)-propane.

7. The process of claim 1 wherein the weight ratio of scrap polyurethane to liquid mixture is from about 15:1 to about 30:1.

8. The process of claim 1 wherein the treatment at elevated temperature occurs in the presence of water present in an amount of up to about 20 weight percent based on total weight of liquid mixture present.

9. The process of claim 1 wherein the polyether polyol-based polyurethane scrap polymer is obtained by reacting an aromatic polyisocyanate with a polyether polyol with has a molecular weight of from at about 1000 to about 10000.

10. An intermediate product suitable for the preparation of a polyether polyol obtainable by thermally treating polyether polyol based scrap polyurethane at an elevated temperature with a liquid mixture which consists of an alkanolamine and a metal hydroxide wherein the weight ratio of scrap polyurethane to liquid mixture is from at least 12:1 and in that the liquid mixture contains the alkanolamine in from about 70 to about 95 weight percent; characterized in that the intermediate is a stable emulsion;

11. A polyol obtainable according to the process of claim 1.

12. A polyether polyol obtainable by thermally treating a polyurethane, produced by reacting a polyether polyol with a molecular weight of from about 1000 to about 10000 with an aromatic polyisocyanate comprising methylene diphenylisocyanate, at an elevated temperature with a liquid mixture which consists of an alkanolamine and a metal hydroxide and subsequently reacting the resulting intermediate product with an alkylene oxide to provide said polyol characterized in that (a) the weight ratio of scrap polyurethane to liquid mixture is from at least 12:1;

(b) the liquid mixture contains from about 70 to about 95 weight percent of alkanolamine; and (c) the alkylene oxide comprising propylene oxide is present in an amount to provide the resulting polyol with a hydroxyl number of from about 30 to about 200.

13. The polyol of claim 12 which comprises up to about 20 weight percent of an alkoxylated methylene diphenylamine adduct derived from the methylene diphenylisocyanate content of the scrap polyurethane.

14. A process for preparing a polyurethane polymer by reacting an organic polyisocyanate with a polyol wherein the polyisocyanate is present in an amount to provide from at least 0.5 isocyanate groups per isocyanate reactive hydrogen atom of the polyol; characterized in that the polyol comprises the polyol of claim 11.

15. A process for preparing a polyurethane polymer by reacting an organic polyisocyanate with a polyol wherein the polyisocyanate is present in an amount to provide from at least 0.5 isocyanate groups per isocyanate reactive hydrogen atom of the polyol; characterized in that the polyol comprises the polyol of claim 12.

16. A polyol composition suitable for the manufacture of a polyurethane polymer characterized in that the composition comprises from about 1 to about 99 weight percent of a polyol according to that of claim 11.

17. A polyurethane polymer obtained according to the process of claim 14.

18. A polyurethane polymer obtained according to the process of claim 15.

19. A liquid polyisocyanate composition which comprises the reaction product of an aromatic polyisocyanate with a polyol according to that of claim 11.

* * * * *